United States Patent
Chang et al.

(10) Patent No.: US 12,530,736 B2
(45) Date of Patent: Jan. 20, 2026

(54) IMAGE SIGNAL PROCESSING WITH AN RGBW COLOR FILTER ARRAY

(71) Applicant: MEDIATEK INC., Hsinchu (TW)

(72) Inventors: Jing-Ying Chang, Hsinchu (TW);
King-Hong Chung, Hsinchu (TW);
Ying-Jui Chen, Hsinchu (TW);
Chi-Cheng Ju, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 408 days.

(21) Appl. No.: 18/164,881

(22) Filed: Feb. 6, 2023

(65) Prior Publication Data
US 2023/0260081 A1    Aug. 17, 2023

Related U.S. Application Data

(60) Provisional application No. 63/310,160, filed on Feb. 15, 2022.

(51) Int. Cl.
*G06T 3/4015* (2024.01)
*G06T 5/70* (2024.01)
*G06T 5/90* (2024.01)
*G06V 10/56* (2022.01)
*G06V 10/60* (2022.01)
*H04N 9/64* (2023.01)
*H04N 23/84* (2023.01)
(Continued)

(52) U.S. Cl.
CPC .............. *G06T 3/4015* (2013.01); *G06T 5/70* (2024.01); *G06T 5/90* (2024.01); *G06V 10/56* (2022.01);
(Continued)

(58) Field of Classification Search
CPC ........... G06T 3/4015; G06T 5/70; G06T 5/90; G06T 2207/10024; G06T 2207/20182; G06T 2207/20192; G06V 10/56; G06V 10/60; H04N 25/46; H04N 23/843; H04N 25/133; H04N 25/11; H04N 9/646;
(Continued)

(56) References Cited

U.S. PATENT DOCUMENTS

| | | | |
|---|---|---|---|
| 8,179,454 B2* | 5/2012 | Li | H04N 25/134 348/241 |
| 8,314,863 B2* | 11/2012 | Tachi | H04N 25/133 348/241 |

(Continued)

OTHER PUBLICATIONS

Kwan, Chiman, and Jude Larkin. "Further improvements of CFA 3.0 by combining inpainting and pansharpening techniques." Signal & Image Processing: An International Journal (SIPIJ) vol. 11 (2020). (Year: 2020).*

(Continued)

*Primary Examiner* — Henok Shiferaw
*Assistant Examiner* — Dion J Satcher
(74) *Attorney, Agent, or Firm* — McClure, Qualey & Rodack, LLP

(57) ABSTRACT

An image processing method is provided. The image processing method is applied to an image signal processor. The image processing method includes the stages detailed in the following paragraph. Binned-Bayer raw data and binned-white raw data are received from an image sensor with an RGBW color filter array. The binned-Bayer raw data include information of red, green, and blue channels for a plurality of pixels. The binned-white raw data include luminance information for the pixels. The pixels are rendered based on both the binned-Bayer raw data and the binned-white raw data.

16 Claims, 7 Drawing Sheets

(51) Int. Cl.
*H04N 25/11* (2023.01)
*H04N 25/133* (2023.01)
*H04N 25/46* (2023.01)

(52) U.S. Cl.
CPC ............. *G06V 10/60* (2022.01); *H04N 25/46* (2023.01); *G06T 2207/10024* (2013.01); *G06T 2207/20182* (2013.01); *G06T 2207/20192* (2013.01)

(58) Field of Classification Search
CPC .. H04N 23/84; H04N 25/60; H04N 2209/046; H04N 1/60; H04N 23/88
USPC ........................................................ 382/167
See application file for complete search history.

(56) References Cited

U.S. PATENT DOCUMENTS

| | | | |
|---|---|---|---|
| 9,049,410 B2* | 6/2015 | Botzas | G09G 3/2074 |
| 11,750,783 B2* | 9/2023 | Cha | H04N 23/84 |
| | | | 348/655 |
| 2012/0026368 A1 | 2/2012 | Cote et al. | |
| 2015/0363912 A1* | 12/2015 | Elliott | G06T 5/50 |
| | | | 348/277 |
| 2016/0191866 A1* | 6/2016 | Onishi | H04N 25/134 |
| | | | 348/270 |
| 2016/0330414 A1* | 11/2016 | Takado | H04N 25/133 |
| 2020/0162706 A1* | 5/2020 | Hikosaka | H04N 23/843 |
| 2021/0344882 A1* | 11/2021 | Park | H04N 25/704 |
| 2021/0409624 A1 | 12/2021 | Powell et al. | |
| 2022/0014697 A1 | 1/2022 | Cote et al. | |

OTHER PUBLICATIONS

Kwan, Chiman, and Jude Larkin. "Demosaicing of bayer and CFA 2.0 patterns for low lighting images." Electronics 8.12 (2019): 1444. (Year: 2019).*

Chinese language office action dated Jun. 27, 2023, issued in application No. TW 112105185.

* cited by examiner

S102

```
Performing a demosaicing process on both
the binned-Bayer raw data and the          — S200
binned-white raw data to generate full-plane
RGB data
```

```
Performing a demosaicing process on the
binned-Bayer raw data to generate full-plane   — S202
RGB data
```
↓
```
Correcting the luminance information of the
full-plane RGB data based on the               — S204
binned-white raw data
```

Migrating the luminance information in the binned-white raw data to the full-plane RGB data —S300

FIG. 3

IMAGE SIGNAL PROCESSING WITH AN RGBW COLOR FILTER ARRAY

CROSS REFERENCE TO RELATED APPLICATIONS

This application claims the benefit of U.S. Provisional Application No. 63/310,160, filed on Feb. 15, 2022, the entirety of which is incorporated by reference herein.

BACKGROUND OF THE INVENTION

Field of the Invention

The present invention relates to an image processing method, and, in particular, to an image processing method applied to an image signal processor with an RGBW color filter array.

Description of the Related Art

Image sensors equipped with the new RGBW color filter array (CFA) are designed to provide increased sensitivity and better low-light image quality by employing a white channel (W), whose spectrum can fully cover that of the red (R), green (G), and blue (B) color channels. Since almost all image signal processors (ISP) accept only Bayer data as an input, for reasons of compatibility, current RGBW sensors are designed by default to output merged Bayer raw data (the binned-Bayer raw data plus the binned-white raw data), and they only provide binned-Bayer raw data and binned-white raw data as an option.

However, if RGBW sensors output the merged Bayer raw data only, this implies that the fine details in the binned-white raw data cannot be preserved in the merged Bayer raw data, due to the "dropped to Bayer" process.

BRIEF SUMMARY OF THE INVENTION

An embodiment of the present invention provides an image processing method that is applied to an image signal processor. The image processing method includes the stages detailed in the following paragraph. Binned-RGB raw data and binned-white raw data are received from an image sensor with an RGBW color filter array. The binned-RGB raw data include information of red, green, and blue channels for a plurality of pixels. The binned-white raw data include luminance information for the pixels. The pixels are rendered based on both the binned-RGB raw data and the binned-white raw data.

According to the image processing method described above, the step of rendering the pixels based on both the binned-RGB raw data and the binned-white raw data includes the stages detailed in the following paragraph. A demosaicing process is performed on both the binned-RGB raw data and the binned-white raw data to generate full-plane RGB data.

According to the image processing method described above, the step of rendering the pixels based on both the binned-RGB raw data and the binned-white raw data includes the stages detailed in the following paragraph. A demosaicing process is performed on the binned-RGB raw data to generate full-plane RGB data. The luminance information of the full-plane RGB data is corrected based on the binned-white raw data.

The image processing method further includes the stages detailed in the following paragraph. Pre-processing is performed on both the binned-RGB raw data and the binned-white raw data.

The image processing method further includes the stages detailed in the following paragraph. Post-processing is performed on the full-plane RGB data.

According to the image processing method described above, pre-processing includes pedestal correction, bad pixel correction, phase difference pixel correction, lens shading correction, digital gain adjustment, white balance gain adjustment, and tone mapping.

According to the image processing method described above, post-processing includes application of a color correction matrix, performing a gamma function, RGB-to-YUV conversion, noise reduction, contrast enhancement, edge enhancement, and color enhancement.

The image processing method further includes the stages detailed in the following paragraph. A de-noise algorithm is performed on both the binned-RGB raw data and the binned-white raw data before and/or after pre-processing.

According to the image processing method described above, the step of correcting the luminance information of the full-plane RGB data based on the binned-white raw data includes the stages detailed in the following paragraph. The luminance information in the binned-white raw data is migrated to the full-plane RGB data.

According to the image processing method described above, the binned-RGB raw data are binned-Bayer raw data formed by an N*N matrix. N is a positive integer. The binned-Bayer raw data correspond to at least 2N*2N pixels.

According to the image processing method described above, the binned-white raw data are formed by an N*N matrix. N is a positive integer. The binned-white raw data correspond to at least 2N*2N pixels.

According to the image processing method described above, the full-plane RGB data include red channel data, green channel data, and blue channel data. The red channel data, the green channel data, and the blue channel data are formed by three N*N matrices respectively. N is a positive integer.

The image processing method further includes the stages detailed in the following paragraph. The binned-RGB raw data and the binned-white raw data are merged after pre-processing to obtain merged raw data. A demosaicing process is performed on the merged raw data and the binned-white raw data

BRIEF DESCRIPTION OF THE DRAWINGS

The present invention can be more fully understood by reading the subsequent detailed description and examples with references made to the accompanying drawings, wherein:

FIG. 2A is a detail flow chart of step S102 in the image processing method in FIG. 1 in accordance with some embodiments of the present invention.

FIG. 2B is a detail flow chart of step S102 in the image processing method in FIG. 1 in accordance with some embodiments of the present invention.

FIG. 3 is a detail flow chart of step S204 in the image processing method in FIG. 2B in accordance with some embodiments of the present invention.

DETAILED DESCRIPTION OF THE INVENTION

Figure 1:
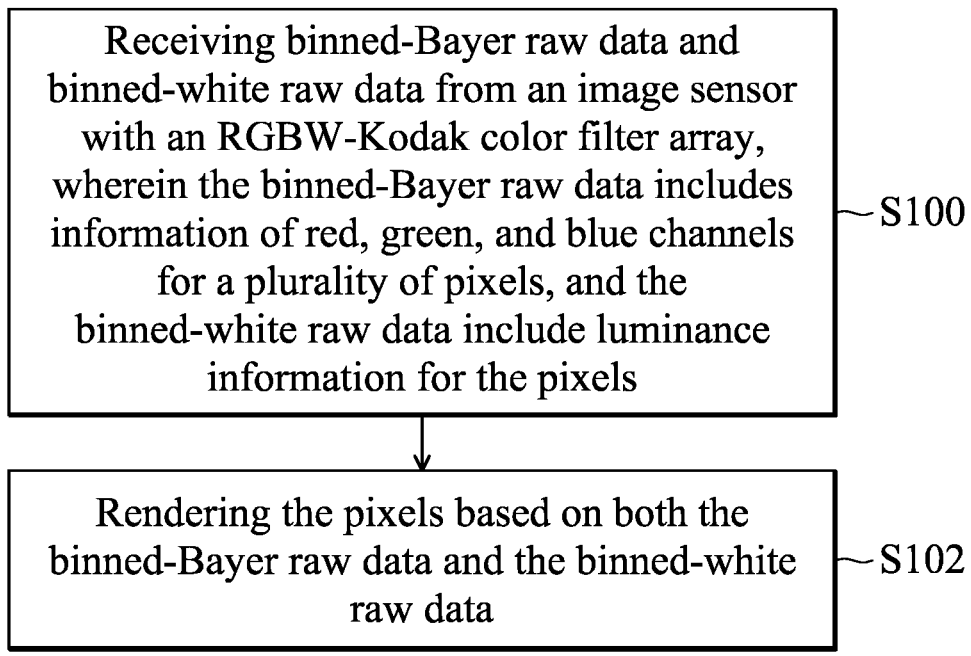
FIG. 1 is a flow chart of an image processing method in accordance with some embodiments of the present invention.

In order to make the above purposes, features, and advantages of some embodiments of the present invention more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present invention are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present invention. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present invention.

FIG. 1 is a flow chart of an image processing method in accordance with some embodiments of the present invention. The image processing method of the present invention in FIG. 1 is applied to an image signal processor (ISP). The image processing method of the present invention includes the stages detailed in the following paragraph. Binned-RGB raw data and binned-white raw data are received from an image sensor with an RGBW color filter array (for example, RGBW-Kodak color filter array). The binned-RGB raw data include information of red, green, and blue channels for a plurality of pixels. The binned-white raw data include luminance information of a white channel for the pixels (step S100). The pixels are rendered based on both the binned-RGB raw data and the binned-white raw data (step S102). In some embodiments, the binned-RGB raw data and the binned-white raw data are generated by the image sensor with an RGBW color filter array. In detail, the image sensor with an RGBW color filter array first captures images. Then, the image sensor generates RGBW raw data based on the images. After that, the image sensor converts the RGBW raw data to both the binned-RGB raw data and the binned-white raw data.

In some embodiments, the binned-RGB raw data are binned-Bayer raw data formed by an N*N matrix, where N is a positive integer. The binned-Bayer raw data correspond to at least 2N*2N pixels. In some embodiments, the binned-white raw data are also formed by an N*N matrix. The binned-white raw data correspond to at least 2N*2N pixels. In some embodiments, N is equal to 4, but the present invention is not limited thereto.

In some embodiments, the detail step in step S102 is shown in FIG. 2A. FIG. 2A is a detail flow chart of step S102 in the image processing method in FIG. 1 in accordance with some embodiments of the present invention. As shown in FIG. 2A, the image processing method of the present invention in step S102 includes the stages detailed in the following paragraph. A demosaicing process is performed on both the binned-RGB raw data and the binned-white raw data to generate full-plane RGB data (step S200). In some embodiments, the demosaicing process converts, by using interpolation, the binned-RGB raw data and the binned-white raw data from the image sensor into a complete RGB data format (that is, full-plane RGB data) that can be seen by human eyes, so as to output the RGB data format on the display device.

In some embodiments, the detail steps in step S102 are shown in FIG. 2B. FIG. 2B is a detail flow chart of step S102 in the image processing method in FIG. 1 in accordance with some embodiments of the present invention. As shown in FIG. 2B, the image processing method of the present invention in step S102 includes the stages detailed in the following paragraph. A demosaicing process is performed on the binned-RGB raw data to generate full-plane RGB data (step S202). The luminance information of the full-plane RGB data is corrected based on the binned-white raw data (step S204). In some embodiments, the demosaicing process converts the binned-RGB raw data from the image sensor into a complete RGB data format (that is, full-plane RGB data) that can be seen by human eyes, so as to output the RGB data format on the display device. In some embodiments, the detail step in step S204 is shown in FIG. 3.

FIG. 3 is a detail flow chart of step S204 in the image processing method in FIG. 2B in accordance with some embodiments of the present invention. As shown in FIG. 3, the image processing method of the present invention in step S204 includes the stages detailed in the following paragraph. The luminance information in the binned-white raw data is migrated to the full-plane RGB data (step S300). No matter the image processing method in FIG. 2A, FIG. 2B, or FIG. 3, the fine details (for example, the luminance information) of binned-white raw data are taken into account for the pixel rendering. In some embodiment, the binned-white raw data also provide additional direction information (of high frequency changing lines in one picture) for the pixel rendering, a better rendering result (that is, the better full-plane RGB data) can therefore be achieved.

In some embodiments, the image processing method of the present invention also pre-processes both the binned-RGB raw data and the binned-white raw data before performing the demosaicing process. In some embodiments, the pre-processing may include pedestal correction, bad pixel correction, phase difference pixel correction, lens shading correction, digital gain adjustment, white balance gain adjustment, and tone mapping, etc., but the present invention is not limited thereto.

In some embodiments, the image processing method of the present invention also performs post-processing on the full-plane RGB data after performing the demosaicing process. In some embodiments, the post-processing may include application of a color correction matrix, performing a gamma function, RGB-to-YUV conversion, noise reduction, contrast enhancement, edge enhancement, and color enhancement, etc., but the present invention is not limited thereto.

In some embodiments, the image processing method of the present invention performs a de-noise algorithm on both the binned-RGB raw data and the binned-white raw data before and/or after pre-processing. For example, before pre-processing, the image processing method of the present invention first inputs both the binned-RGB raw data and the binned-white raw data into a de-noising solution. The de-noising solution is performed to de-noise both the binned-RGB raw data and the binned-white raw data. In some embodiments, after pre-processing, the image processing method of the present invention merges and de-noise both the binned-RGB raw data and the binned-white raw data before performing the demosaicing process, so that merged-Bayer raw data is obtained. In some embodiments, the merged-Bayer raw data can attain a lesser noise, but have the same level of fine details as the binned-RGB raw data when comparing with binned-RGB raw data. After that, the image processing method of the present invention performs the demosaicing process on both the merged-Bayer raw data and the binned-white raw data. In some embodiments, the merged-Bayer raw data can be obtained from in-sensor solutions, the de-noising hardware/software solutions, or application processor (AP) solutions, but the present invention is not limited thereto.

Figure 4:
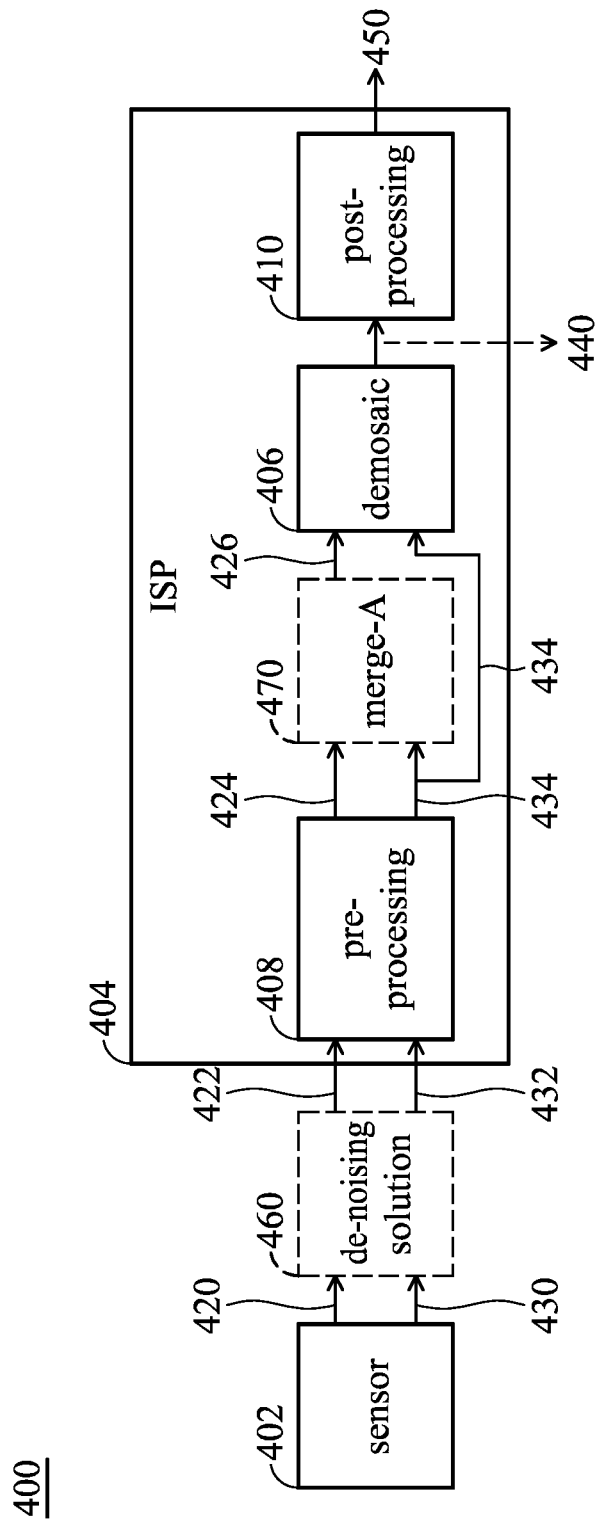
FIG. 4 is a schematic diagram of an electronic device 400 performing the image processing method in FIG. 1 and FIG. 2A in accordance with some embodiments of the present invention.

FIG. 4 is a schematic diagram of an electronic device 400 performing the image processing method in FIG. 1 and FIG. 2A in accordance with some embodiments of the present invention. As shown in FIG. 4, the electronic device 400 includes a sensor 402 and an image signal processor (ISP) 404. In some embodiments, the sensor 402 is an image sensor, such as a camera, but the present invention is not limited thereto. In some embodiments, the sensor 402 captures images, and outputs binned-RGB raw data 420 and binned-white raw data 430 based on the images accordingly. The image signal processor 404 receives the binned-RGB raw data 420 and the binned-white raw data 430 from the sensor 402. The image signal processor 404 performs pre-processing 408 on both the binned-RGB raw data 420 and the binned-white raw data 430 to output binned-RGB raw data 424 and binned-white raw data 434. In some embodiments, pre-processing may include pedestal correction, bad pixel correction, phase difference pixel correction, lens shading correction, digital gain adjustment, white balance gain adjustment, and tone mapping, etc., but the present invention is not limited thereto. After that, the image signal processor 404 performs a demosaicing process 406 on both the binned-RGB raw data 424 and the binned-white raw data 434 to generate full-plane RGB data 440.

Then, the image signal processor 404 performs post-processing 410 on the full-plane RGB data 440 to output final output data 450. In some embodiments, the post-processing process includes application of a color correction matrix, performing a gamma function, RGB-to-YUV conversion, noise reduction, contrast enhancement, edge enhancement, and color enhancement, etc., but the present invention is not limited thereto.

In some embodiments, a de-noising solution 460, which may be provided from a $3^{rd}$ party solution, is performed to de-noise the both the binned-RGB raw data 420 and the binned-white raw data 430. For example, the de-noising solution 460 is performed by another processor (not shown, for example, an application processor) in the electronic device 400 to de-noise the both the binned-RGB raw data 420 and the binned-white raw data 430, and outputs binned-RGB raw data 422 and binned-white raw data 432 accordingly. After that, the image signal processor 404 performs a pre-processing 408 on the binned-RGB raw data 422 and the binned-white raw data 432.

In some embodiments, the image signal processor 404 performs a merging function (merge-A) 470 on both the binned-RGB raw data 424 and the binned-white raw data 434 to obtain merged-Bayer raw data 426. In some embodiments, the image signal processor 404 also performs the merging function 470 to de-noise both the binned-RGB raw data 424 and the binned-white raw data 434. The merged-Bayer raw data 426 can attain a lesser noise, but have the same level of fine details as binned-RGB raw data 424 when comparing with the binned-RGB raw data 424. After that, the image signal processor 404 performs the demosaicing process on the merged-Bayer raw data 426 and the binned-white raw data 434 to generate the full-plane RGB data 440.

In some embodiments, since the de-noising solution 460 and the merging function 470 are optional, when the de-noising solution 460 is not present, the binned-RGB raw data 422 is equal to the binned-RGB raw data 420, and the binned-white raw data 432 is equal to the binned-white raw data 430. Similarly, when the merging function 470 is not performed by the image signal processor 404, the merged-Bayer raw data 426 is equal to the binned-RGB raw data 424.

Figure 5:
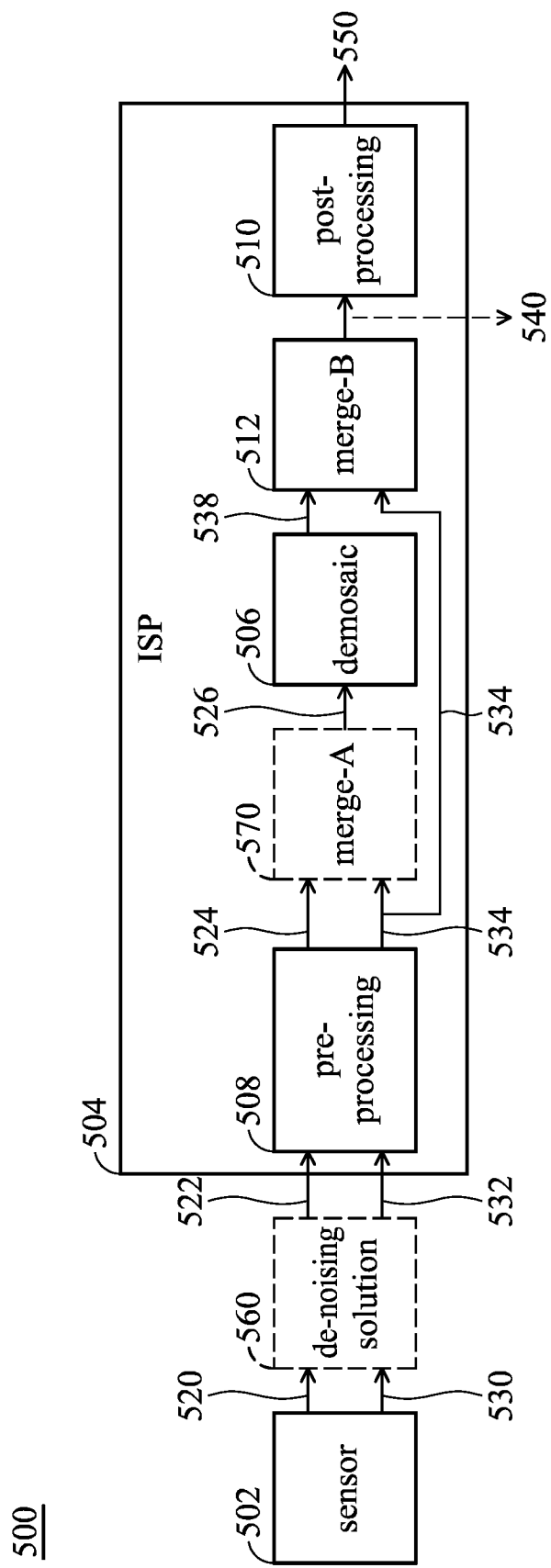
FIG. 5 is a schematic diagram of an electronic device 500 performing the image processing method in FIG. 1 and FIG. 2B in accordance with some embodiments of the present invention.

FIG. 5 is a schematic diagram of an electronic device 500 performing the image processing method in FIG. 1 and FIG. 2B in accordance with some embodiments of the present invention. As shown in FIG. 5, the electronic device 500 includes a sensor 502 and an image signal processor (ISP) 504. In some embodiments, the sensor 502 is an image sensor, such as a camera, but the present invention is not limited thereto. In some embodiments, the sensor 502 captures images, and outputs binned-RGB raw data 520 and binned-white raw data 530 based on the images accordingly. The image signal processor 504 receives the binned-RGB raw data 520 and the binned-white raw data 530 from the sensor 502. The image signal processor 504 performs pre-processing 508 on both the binned-RGB raw data 520 and the binned-white raw data 530 to output binned-RGB raw data 524 and binned-white raw data 534. In some embodiments, the pre-processing may include pedestal correction, bad pixel correction, phase difference pixel correction, lens shading correction, digital gain adjustment, white balance gain adjustment, and tone mapping, etc., but the present invention is not limited thereto.

After that, the image signal processor 504 performs a demosaicing process 506 on the binned-RGB raw data 524 to generate full-plane RGB data 538. Then, the image signal processor 504 performs a merging function (merge-B) 512 on both the full-plane RGB data 538 and the binned-white raw data 534 to obtain full-plane RGB data 540. In detail, the image signal processor 504 performs the merging function 512 to migrate the luminance information in the binned-white raw data 534 to the full-plane RGB data 538, and outputs the full-plane RGB data 540 accordingly. In some embodiments, the full-plane RGB data 540 can attain a lesser noise, but have the same level of fine details as the full-plane RGB data 538 when comparing with the full-plane RGB data 538.

Then, the image signal processor 504 performs a post-processing 510 on the full-plane RGB data 540 to output final output data 550. In some embodiments, the post-processing includes application of a color correction matrix, performing a gamma function, RGB-to-YUV conversion, noise reduction, contrast enhancement, edge enhancement, and color enhancement, etc., but the present invention is not limited thereto.

In some embodiments, a de-noising solution 560, which may be provided from a $3^{rd}$ party solution, is performed to de-noise the both the binned-RGB raw data 520 and the binned-white raw data 530. For example, the de-noising solution 560 is performed by another processor (not shown, for example, an application processor) in the electronic device 500 to de-noise the both the binned-RGB raw data 520 and the binned-white raw data 530, and outputs binned-RGB raw data 522 and binned-white raw data 532 accordingly. After that, the image signal processor 504 performs pre-processing 508 on the binned-RGB raw data 522 and the binned-white raw data 532.

In some embodiments, the image signal processor 504 performs a merging function (merge-A) 570 on both the binned-RGB raw data 524 and the binned-white raw data 534 to obtain merged-Bayer raw data 526. In some embodiments, the image signal processor 504 also performs the merging function 570 to de-noise both the binned-RGB raw data 524 and the binned-white raw data 534. The merged-Bayer raw data 526 can attain a lesser noise, but have the same level of fine details as binned-RGB raw data 524 when comparing with the binned-RGB raw data 524. After that, the image signal processor 504 performs the demosaicing process on the merged-Bayer raw data 526 to generate the full-plane RGB data 538. In some embodiments, since the de-noising solution 560 and the merging function 570 are optional, when the de-noising solution 560 is not present, the binned-RGB raw data 522 is equal to the binned-RGB raw data 520, and the binned-white raw data 532 is equal to the binned-white raw data 530. Similarly, when the merging function 570 is not performed by the image signal processor 504, the merged-Bayer raw data 526 is equal to the binned-RGB raw data 524. In some embodiments, the pre-processing 508 and the post-processing 510 are also optional, but the present invention is not limited thereto.

Figure 6:
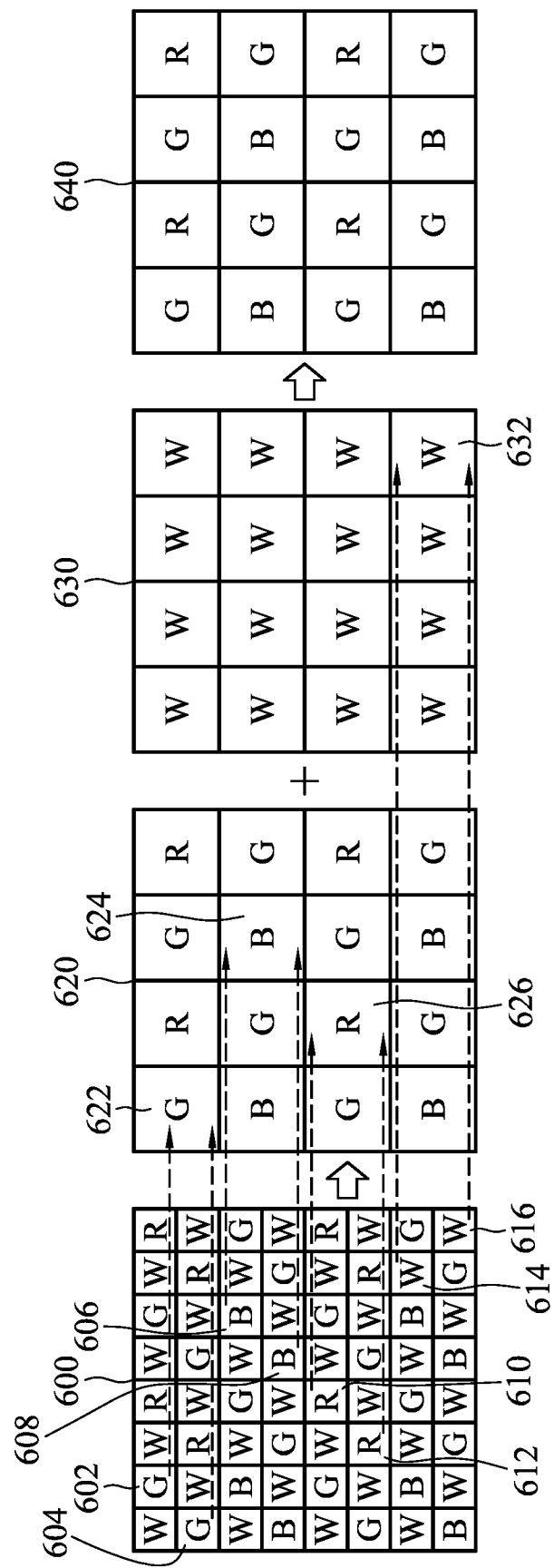
FIG. 6 is a schematic diagram of data structures of RGBW raw data 600, binned-RGB raw data 620, binned-white raw data 630, and merged-Bayer raw data 640 in accordance with some embodiments of the present invention.

FIG. 6 is a schematic diagram of data structures of RGBW raw data 600, binned-RGB raw data 620, binned-white raw data 630, and merged-Bayer raw data 640 in accordance with some embodiments of the present invention. The characters "R", "G", "B", and "W" marked in the RGBW raw data 600, the binned-RGB raw data 620, the binned-white raw data 630, and the merged-Bayer raw data 640 represent different color channels displayed by a plurality of pixels. For example, the character "R" represents the red channel displayed by one pixel. The character "G" represents the green channel displayed by one pixel. The character "B" represents the blue channel displayed by one pixel. The character "W" represents the white channel displayed by one pixel.

As shown in FIG. 6, the RGBW raw data 600 is generated by an image sensor with an RGBW color filter array, such as the sensor 402 in FIG. 4 and the sensor 502 in FIG. 5. In some embodiments of FIG. 6, the RGBW raw data 600 are formed by an 8*8 matrix. The RGBW raw data 600 correspond to at least 64(8*8) pixels, but the present invention is not limited thereto. The RGBW raw data 600 are converted into binned-RGB raw data 620 and binned-white raw data 630 by the image sensor. For example, the image sensor averages the green channels in elements 602 and 604 of the RGBW raw data 600 to obtain the element 622 in the binned-RGB raw data 620. The image sensor averages the blue channels in elements 606 and 608 of the RGBW raw data 600 to obtain the element 624 in the binned-RGB raw data 620. The image sensor averages the red channels in elements 610 and 612 of the RGBW raw data 600 to obtain the element 626 in the binned-RGB raw data 620. Similarly, the image sensor averages the white channels in elements 614 and 616 of the RGBW raw data 600 to obtain the element 632 in the binned-white raw data 630.

Please refer to FIG. 5 and FIG. 6 at the same time. It is assumed that the binned-RGB raw data 524 in FIG. 5 is equivalent to the binned-RGB raw data 620 in FIG. 6, the binned-white raw data 534 in FIG. 5 is equivalent to the binned-white raw data 630 in FIG. 6, and the merged-Bayer raw data 526 is equivalent to the merged-Bayer raw data 640. In some embodiments, when an image signal processor (such as the image signal processor 504 in FIG. 5) performs a merging function (such as the merging function 570 in FIG. 5, instead of the merging function 512), the binned-RGB raw data 620 and the binned-white raw data 630 are merged to obtain the merged-Bayer raw data 640. In some embodiments, the merged-Bayer raw data 640 can attain a lesser noise, but have the same level of fine details as the binned-RGB raw data 620 when comparing with binned-RGB raw data 620. In some embodiments, there is also similar correspondence between FIG. 4 and FIG. 6, thus the present invention will not repeat herein again.

As shown in FIG. 6, the binned-RGB raw data 620 are formed by a 4*4 matrix, the binned-white raw data 630 are formed by a 4*4 matrix, and the merged-Bayer raw data 640 are formed by a 4*4 matrix, but the present invention is not limited thereto. In some embodiments, the binned-RGB raw data 620, the binned-white raw data 630, and the merged-Bayer raw data 640 all correspond to at least 64 pixels, but the present invention is not limited thereto.

Figure 7:
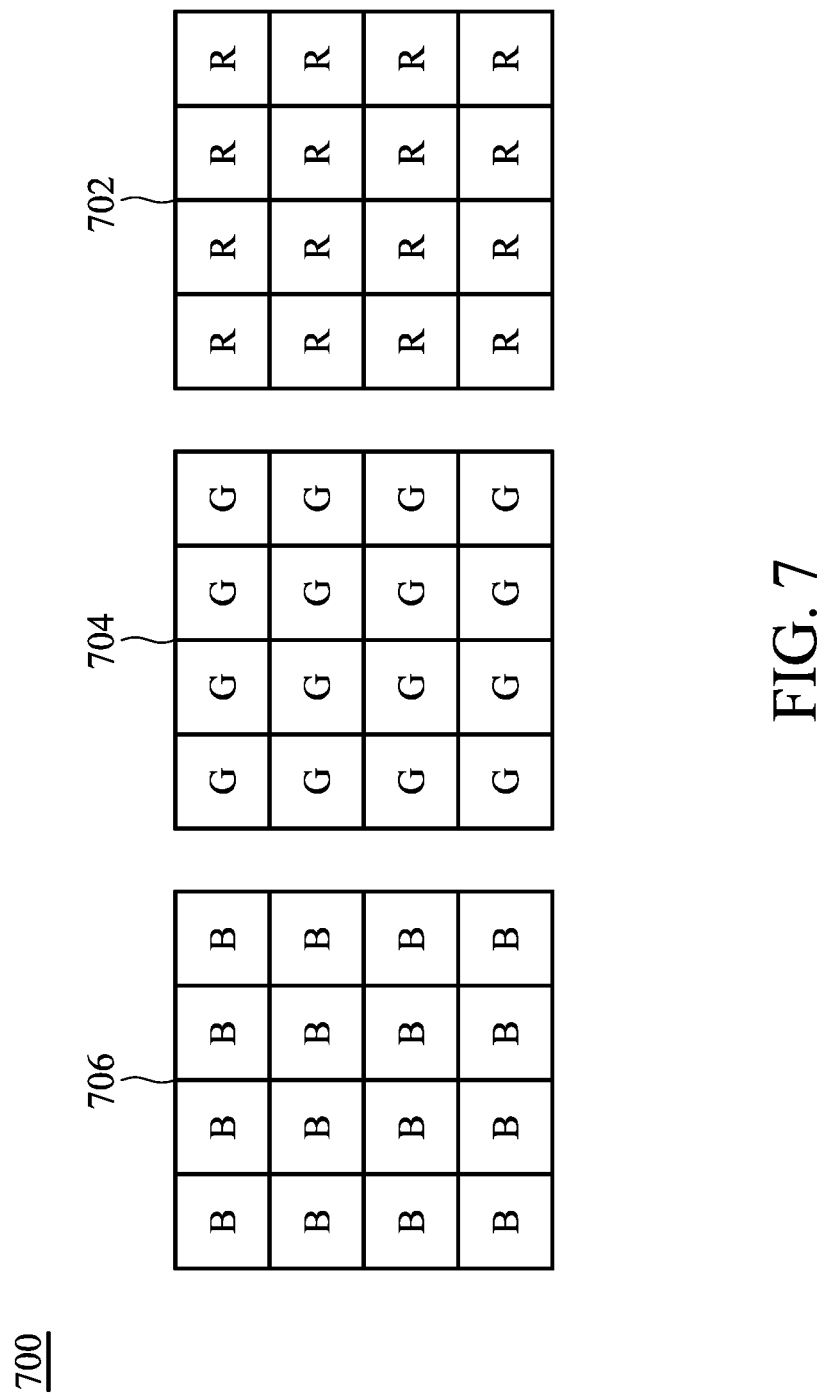
FIG. 7 is a schematic diagram of data structures of full-plane RGB data 700 in accordance with some embodiments of the present invention.

FIG. 7 is a schematic diagram of data structures of full-plane RGB data 700 in accordance with some embodiments of the present invention. The full-plane RGB data 700 in FIG. 7 are equivalent to the full-plane RGB data 440 in FIG. 4 and the full-plane RGB data 538 and 540 in FIG. 5. As shown in FIG. 7, the full-plane RGB data 700 includes red channel data 702, green channel data 704, and blue channel data 706. In some embodiments, the red channel data 702 are formed by a 4*4 matrix, the green channel data 704 are formed by a 4*4 matrix, and the blue channel data 706 are formed by a 4*4 matrix, but the present invention is not limited thereto.

The image processing method uses the binned-white raw data for pixel rendering, a better rendering result (that is, the better full-plane RGB data) can therefore be achieved. That is, the resolution of the full-plane RGB data can be improved.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing method, applied to an image signal processor, comprising:
   receiving binned-RGB raw data and binned-white raw data from an image sensor with an RGBW color filter array, wherein the binned-RGB raw data comprises information of red, green, and blue channels for a plurality of pixels, and the binned-white raw data comprises luminance information of a white channel for the pixels; and
   rendering the pixels based on both the binned-RGB raw data and the binned-white raw data, wherein the rendering comprises:
      performing a demosaicing process on the binned-RGB raw data to generate full-plane RGB data; and
      correcting the luminance information of the full-plane RGB data based on the binned-white raw data.

2. The image processing method as claimed in claim 1, wherein the step of rendering the pixels based on both the binned-RGB raw data and the binned white raw data comprises:
   performing a demosaicing process on both the binned-RGB raw data and the binned-white raw data to generate full-plane RGB data.

3. The image processing method as claimed in claim 1, further comprising:
   performing pre-processing on both the binned-RGB raw data and the binned-white raw data.

4. The image processing method as claimed in claim 2, further comprising:
   performing post-processing on the full-plane RGB data.

5. The image processing method as claimed in claim 1, further comprising:
   performing post-processing on the full-plane RGB data.

6. The image processing method as claimed in claim 3, wherein the pre-processing comprises at least one of pedestal correction, bad pixel correction, phase difference pixel correction, lens shading correction, digital gain adjustment, white balance gain adjustment, and tone mapping.

7. The image processing method as claimed in claim 4, wherein the post-processing comprises at least one of application of a color correction matrix, performing a gamma function, RGB-to-YUV conversion, noise reduction, contrast enhancement, edge enhancement, and color enhancement.

8. The image processing method as claimed in claim 5, wherein the post-processing process comprises at least one of application of a color correction matrix, performing a gamma function, RGB-to-YUV conversion, noise reduction, contrast enhancement, edge enhancement, and color enhancement.

9. The image processing method as claimed in claim 3, further comprising:
   performing a de-noise processing on both the binned-RGB raw data and the binned-white raw data before and/or after performing the pre-processing.

10. The image processing method as claimed in claim 1, wherein the step of correcting the luminance information of the full-plane RGB data based on the binned-white raw data comprises: migrating the luminance information in the binned-white raw data to the full-plane RGB data.

11. The image processing method as claimed in claim 1, wherein the binned-RGB raw data are binned-Bayer raw data formed by an N*N matrix, and N is a positive integer; wherein the binned-Bayer raw data correspond to at least 2N*2N pixels.

12. The image processing method as claimed in claim 1, wherein the binned-white raw data are formed by an N*N matrix, N is a positive integer; wherein the binned-white raw data correspond to at least 2N*2N pixels.

13. The image processing method as claimed in claim 2, wherein the full-plane RGB data comprise red channel data, green channel data, and blue channel data; wherein the red channel data, the green channel data, and the blue channel data are formed by three N*N matrices, N is a positive integer.

14. The image processing method as claimed in claim 3, further comprising:
   merging the binned-RGB raw data and the binned-white raw data after performing pre-processing to obtain merged raw data; and
   performing a demosaicing process on the merged raw data and the binned-white raw data.

15. The image processing method as claimed in claim 1, wherein the binned-white raw data provide additional direction information of high frequency changing lines in one picture for pixel rendering.

16. An electronic device, comprising:
   a sensor comprising an RGBW color filter array; and
   an image signal processor, wherein the image signal processor is configured to:
      receive binned-RGB raw data and binned-white raw data from the sensor, wherein the binned-RGB raw data comprise information of red, green, and blue channels for a plurality of pixels, and the binned-white raw data comprise luminance information of a white channel for the pixels; and render the pixels based on both the binned-RGB raw data and the binned-white raw data, wherein the image signal processor is further configured to render the pixels by:

performing a demosaicing process on the binned-RGB raw data to generate full-plane RGB data; and correcting the luminance information of the full-plane RGB data based on the binned-white raw data.

\* \* \* \* \*